Figure 1:
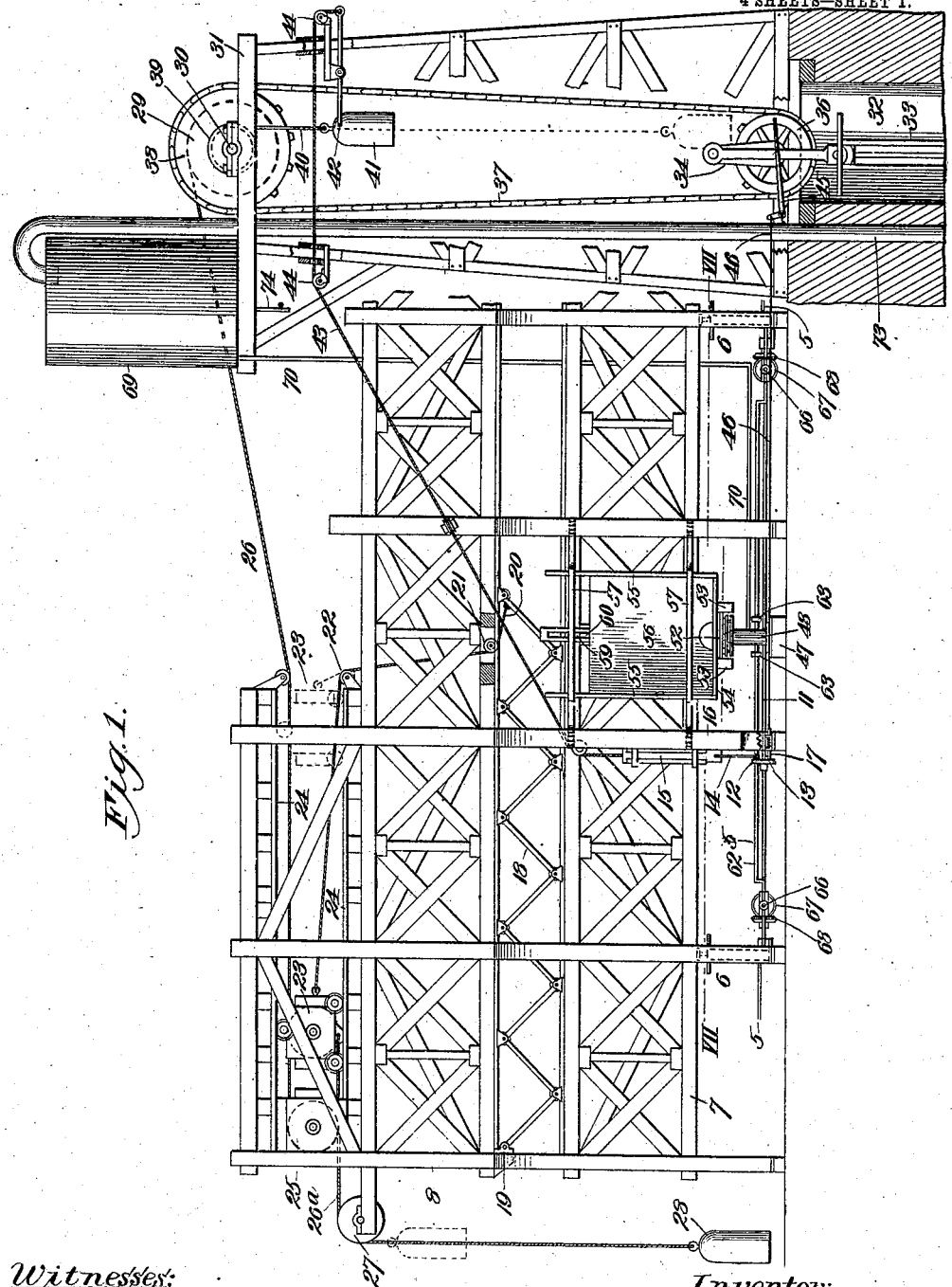

No. 855,100. PATENTED MAY 28, 1907.
W. W. DOUGLASS.
WATER ELEVATING AND STORAGE APPARATUS.
APPLICATION FILED DEC. 18, 1905.

4 SHEETS—SHEET 1.

Witnesses:
H. C. Rodgers
Fred V. Griffith

Inventor:
W. W. Douglass
By George ⟨⟩ Thorpe
Atty.

No. 855,100. PATENTED MAY 28, 1907.
W. W. DOUGLASS.
WATER ELEVATING AND STORAGE APPARATUS.
APPLICATION FILED DEC. 18, 1905.
4 SHEETS—SHEET 2.
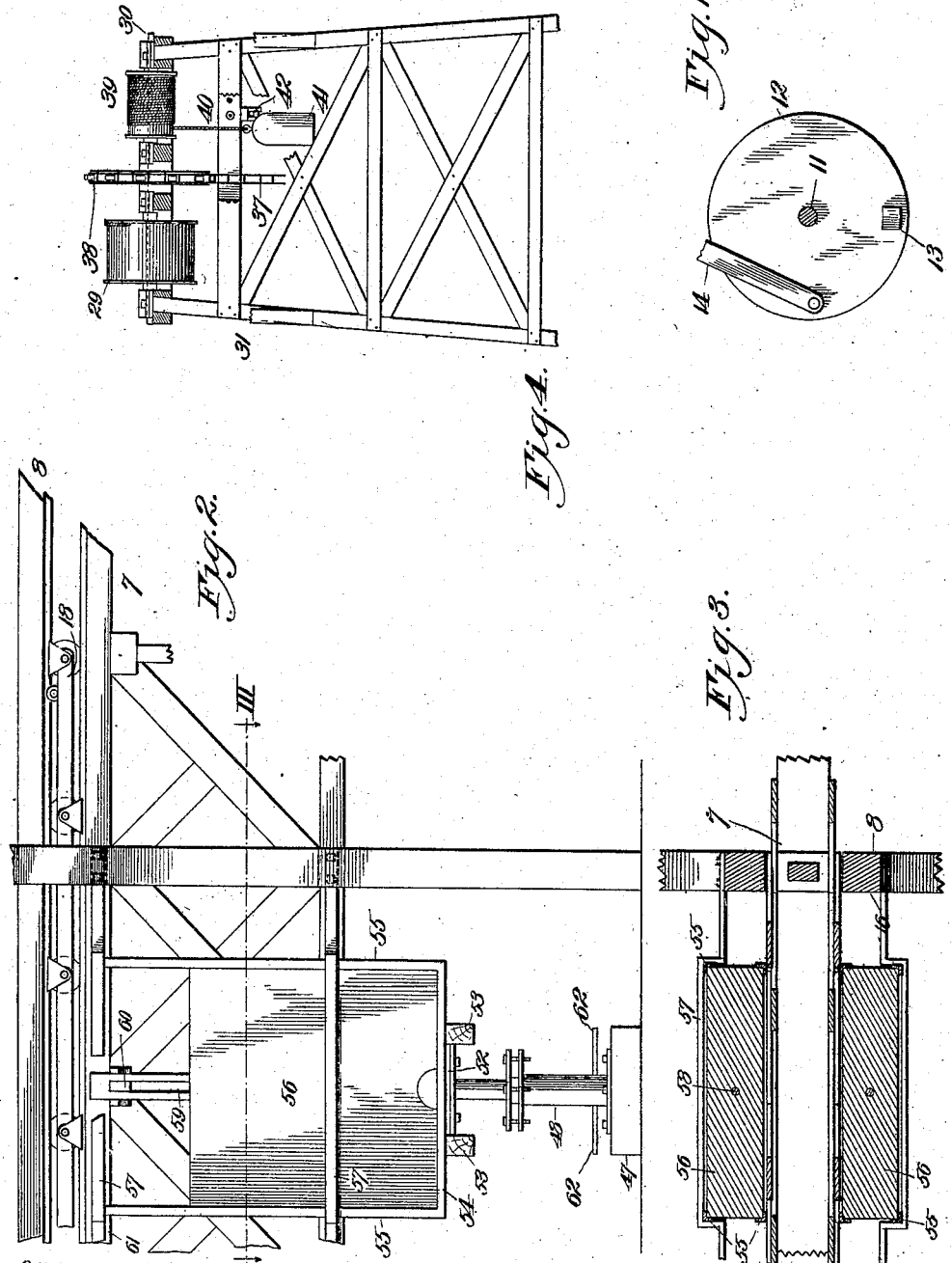
Witnesses:
Fred. Griffith
H. C. Rodgers
Inventor:
W. W. Douglass.
By George␣␣␣␣␣
Atty.

No. 855,100. PATENTED MAY 28, 1907.
W. W. DOUGLASS.
WATER ELEVATING AND STORAGE APPARATUS.
APPLICATION FILED DEC. 18, 1905.
4 SHEETS—SHEET 3.
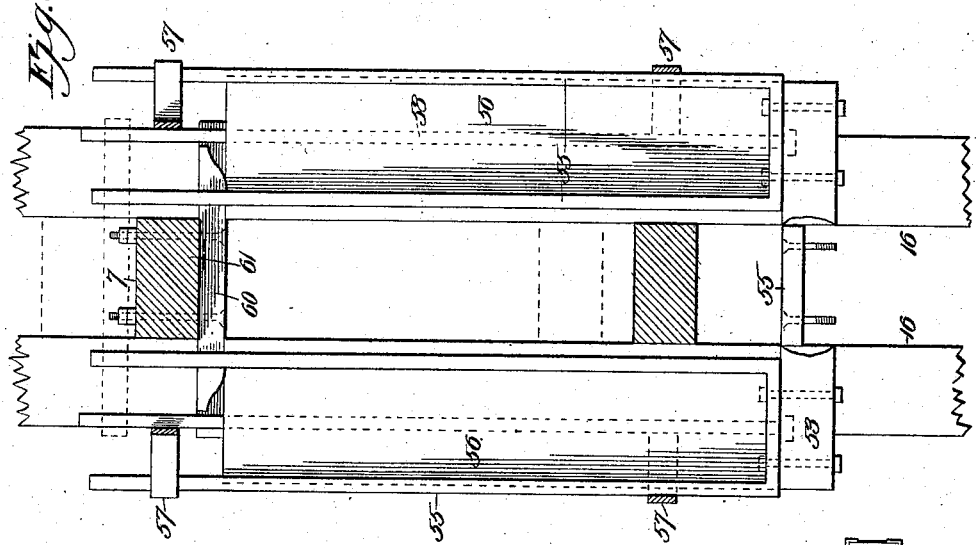
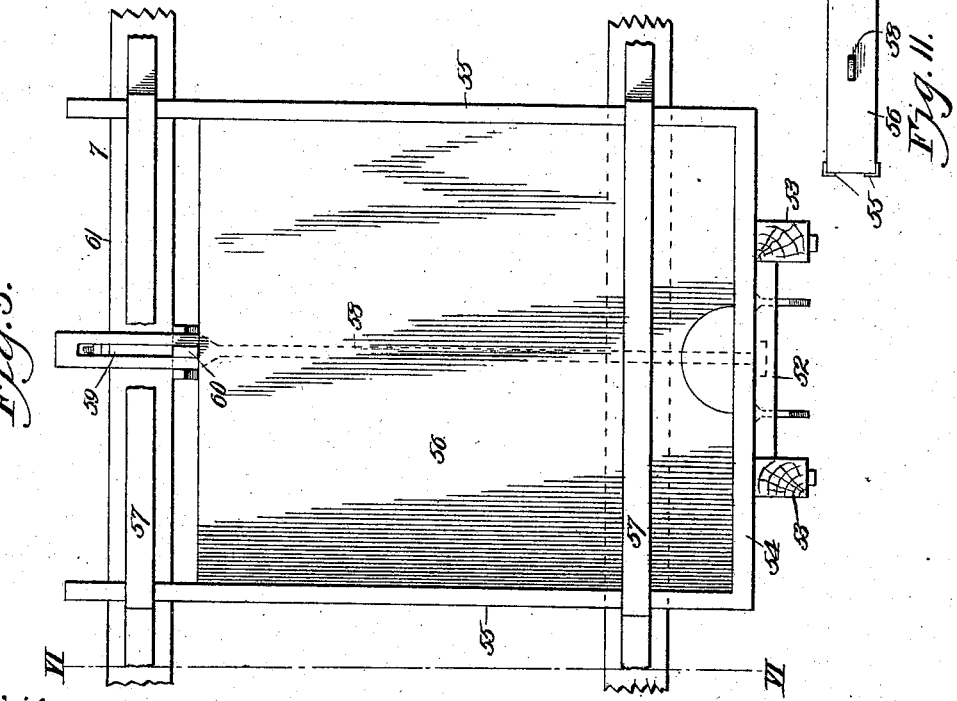
Witnesses
Inventor
W. W. Douglass
By
atty.

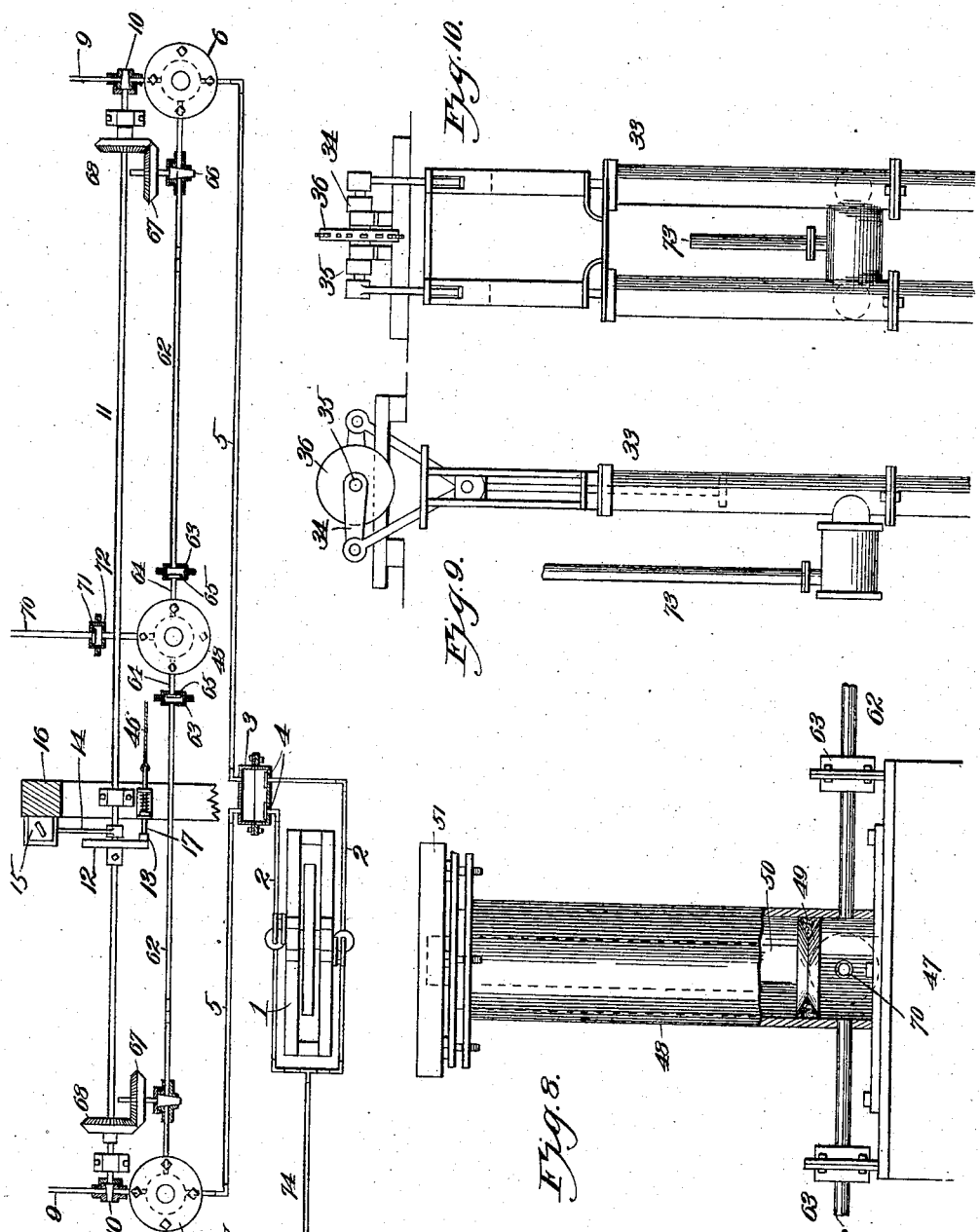

UNITED STATES PATENT OFFICE.

WILLIAM WOODROE DOUGLASS, OF SALT LAKE CITY, UTAH.

WATER ELEVATING AND STORAGE APPARATUS.

No. 855,100.          Specification of Letters Patent.          Patented May 28, 1907.

Application filed December 18, 1905. Serial No. 292,365.

*To all whom it may concern:*

Be it known that I, WILLIAM WOODROE DOUGLASS, a citizen of the United States, residing at Salt Lake City, in the county of Salt Lake and State of Utah, have invented certain new and useful Improvements in Water Elevating and Storage Apparatus, of which the following is a specification.

My invention relates to water elevating and storage apparatus and more particularly to apparatus of the character illustrated and described in my Patent No. 809,361, issued Jan. 9, 1906, on water elevating and storage apparatus, my special object being to produce what I term an accumulator to equalize the advantages of leverage gained by reinforcing the fore part of the movement by leverage gained in the latter part, for the purpose of increasing the power and insuring uniformity in the operation of the apparatus.

With this general object in view the invention consists in certain novel and peculiar features of construction and organization as hereinafter described and claimed, and in order that it may be fully understood reference is to be had to the accompanying drawings, in which—

Figure 1, is a side elevation of a water elevating and storage apparatus embodying my improvement. Fig. 2, is an enlarged side view of a part of the apparatus with the lazytong lever expanded. Fig. 3, is a horizontal section on the line III—III of Fig. 2. Fig. 4, is a view of the rear end of the water elevating tower forming part of the apparatus. Fig. 5, is an enlarged side view of a part of the power accumulating and equalizing mechanism. Fig. 6, is a vertical section on the line VI—VI of Fig. 5. Fig. 7, is an enlarged horizontal section taken on the line VII—VII of Fig. 1. Fig. 8, is an enlarged view partly in section of a part of the accumulator and equalizing mechanism. Fig. 9, is an enlarged side view of the pump shown in Fig. 1. Fig. 10, is a front view of the same. Fig. 11, is a plan view on a small scale of one of the weights and its holder, and Fig. 12, is a section of shaft 11 and shows one face of disk 12.

In the said drawings, 1 indicates a force pump mechanism adapted to be operated by a revolving platform of the character shown in my patent hereinbefore referred to, or otherwise. 2 are pipes leading from the force pumps to a casing 3, having valves 4 which open under the pressure of water from pipes 2. 5 are pipes leading from the valve casing to a pair of hydraulic jacks 6 of the same character as the hydraulic jacks in the aforesaid patent; said jacks being arranged to support a vertically movable frame 7 mounted in a framework 8, said frame 7 descending to its original position by gravity and the action of a weight hereinafter described when the water in the jacks is permitted to escape.

Each jack is provided with a discharge pipe 9, controlled by valves 10 operated by shaft 11, suitably journaled and equipped with a disk 12, having a tooth 13, and wristed by link 14 to a vertically adjustable weight 15 mounted on one of the stationary uprights 16 of frame 8. Pressing against said wheel or disk in the plane of movement of the tooth is a spring-pressed dog 17 for the purpose of snapping under the tooth when the wheel is revolved through the upward movement of the weight 15 as hereinafter explained, the dog thus serving to lock the weight in its elevated position and incidentally lock the valves 10 in their closed position.

18 indicates a lazy-tong lever arranged between and having a sliding relation with the rigid upper portion of frame 8 and the vertically movable frame 7, one end of the lazytong lever being anchored as at 19, to said frame 8, and the other or movable end being attached to a cable 20, which extends up through the upper portion of frame 8, being guided over pulleys 21 and 22, and from the latter the cable extends and is attached to a traveling drum 23 mounted on and between trackways 24 in the upper part of the framework.

25 is a stationary drum and coiled around drums 23 and 25 a number of times so as to form a plurality of loops connecting them is a cable 26, one end of the cable being secured to drum 25 by preference and the other end to a drum 29 hereinafter referred to. A cable 26ᵃ secured at its front and upper end to traveling drum 23 extends over a pulley 27 and carries a weight 28. The drum 29 is mounted on a shaft 30, journaled at the upper end of the tower 31. Said tower is disposed over a well 32, containing a suitable pump 33, connected to crank arms 34 of a shaft 35 suitably journaled. Rigid on said shaft is a sprocket wheel 36 connected by an endless chain 37 to a sprocket wheel 38 rigid on shaft 30.

39 is a small drum rigid on shaft 30, and mounted on said drum 39 and adapted to be secured thereto in any suitable manner, not shown, is a cable 40 equipped with a weight 41, said weight being elevated when weight 28 is depressed and the lazy tong lever is contracted, as shown in Fig. 1. When the parts are in the position described the weight 41 holds elevated the free end of a lever 42, mounted on the tower, the opposite or depressed end of said lever being connected to a cable 43 suitably guided over pulleys 44 to the upper end of the sliding weight 15, which weight is held elevated by the engagement of the spring actuated dog 17 with the under side of the tooth 13 of disk 12.

45 is a bell-crank lever suitably pivoted and having one arm in the plane of movement of weight 41, and its other arm connected by a cable 46 to the spring actuated dog 17, so that when weight 41 descends and operates said lever it effects the withdrawal of the dog from the path of tooth 13 and permits weight 15 to descend. The descent of the weight rotates the disk and therefore turns shaft 11 and opens valves 10. As the valves are opened the water is discharged from the jacks through pipes 9 and as a consequence the frame 7 slides downward and effects the retraction of the lazy tong lever which lever when the frame was elevated was expanded as shown in Fig. 2, it being likewise understood that when it is expanded the traveling drum 23 and weight 28 occupied the positions shown in dotted lines Fig. 1, it being also obvious that weight 41 occupies its depressed position and was resting on the lever 45.

With the exception of the simplification of the tower and water pumping mechanism the parts thus far described are precisely the same in construction as in the patent hereinbefore referred to. The mode of operation of such parts is essentially the same and they have been described and illustrated in order that an intelligent idea of the construction and operation of the power accumulating and equalizing attachment may be readily understood.

47 is a support for the cylinder 48 provided with a piston 49, having its stem 50 projecting up through the top of the cylinder and equipped with a head 51 secured in any suitable manner to the plate 52, between a pair of timbers 53, said timbers resting upon the ground or other suitable support and underlying the vertically movable frame 7. Bolted upon and to said chambers at each side of frame 7 is a skeleton holder consisting primarily of a base portion 54 and upright angle iron portions 55, the latter being disposed rectangularly with respect to each other and holding between them a weight 56 of concrete or other suitable material. These weight holders are adapted as hereinafter explained to be moved upward by the latter part of the upward movement of frame 7 and to guide them in such movement and also in their downward movement hereinafter referred to, guide clips 57 are carried by the frame 7.

Each weight is provided with a central rod 58 having its upper end projecting beyond that of the weight and provided with a slot 59 engaged by the opposite ends of the cross bar 60 carried by the upper sill 61 of frame 7.

62 indicates pipes connecting the hydraulic jacks 6, having valve casings 63, and said casings are connected by pipes 64 with the cylinder 48, valves 65 arranged in the valve casings preventing water from passing from the jacks into the cylinder but opening to permit water to pass from the cylinder to the jacks at certain times.

66 indicates valves controlling the passage of water through pipes 62, and having their stems provided with cog wheels 67 meshing with similar cog wheels 68 on shaft 11, so that the downward movement of weight 15 occurring when spring-actuated dog 17 is withdrawn, not only rotates shaft 11 and opens valves 10 but also closes valves 66, in order to retain the piston and consequently the weights in their elevated positions, it being understood that as said piston and weights were elevated a flow of water occurred from the reservoir 69 through pipe 70 into the lower end of cylinder 48, a check valve 71 arranged in the casing 72 of said pipe permitting the water to flow into the cylinder but preventing it escaping from the cylinder through said pipe, it being also understood that the reservoir mounted upon the top of the tower is charged with the water forced up through pipe 73 of pump 33. The reservoir not only supplies water to the cylinder through pipe 70 but likewise supplies the pumping mechanism 1 through pipe 74, as shown in Fig. 1.

The practical operation of the apparatus is as follows: Assuming the parts to be as shown in Fig. 1, it will be apparent, that the operation of the pumping mechanism 1 will pump water through pipes 5 into the hydraulic jacks 6, this action raising the pistons of the jacks and the frame 7 thereon. The entire upward movement of frame 7 acts upon the lazy tong lever 18 to gradually extend the same but the first half of such upward movement does not affect and is not affected by the presence of the accumulating mechanism, it being undesirable to raise the weights 56 during the first half of the lever movement because its leverage at such times is weakest. The gradual extension of said lever is of course accompanied by the forward movement of the drum 23 and the elevation of weight 28. This movement of the drum 23 likewise elevates the weight 41. When about half of the upward movement of the frame 7 has been completed and sufficient leverage has been obtained on the lazy tong lever, the cross bar 60 engages the upper end of slots 59 and begins to raise weights 56, this action incidentally raising the pistons 49 in order that water from the reservoir may flow through pipe 70 past check valve 71 and into the cylinder below its piston, the upward movement of weights 56 terminating at the same moment that the extension of the lazy tong lever ceases and likewise at the same moment that weights 28 and 41 attain their highest positions. As such movement of the last-named weight ends, it strikes and raises the inner end of lever 42 and therefore raises weight 15 and rotates shaft 11 and valves 10 and 66, opening valves 10 and closing valves 66. As this action occurs tooth 13 of disk 12 passes spring-actuated dog 17 and the latter snaps back of said tooth to prevent back rotation. The opening of the valves 10 is of course instantly followed by the descent of frame 7 and the retraction of the lazy tong lever and this action in turn permits the drum 23 and weights 28 and 41, to return to their original positions, the water in the jacks of course escaping through the discharge pipes 9, the weights 56 being reliably held in their elevated positions because the water in cylinder 48 is cut off from escape by the closed valves 66 and the check valve 71. At the moment that weight 41 reaches its lower limit of travel it strikes and operates lever 45 and causes the same through the medium of cable 46 to withdraw dog 17 from the path of tooth 13 and permit weight 15 to slide downward to its original position and reclose valves 10 and reopen valves 66. As soon as said valves 10 are reclosed, the pumping mechanism again forces water into the hydraulic jacks to raise frame 7, but in this second and all succeeding elevating operations the power employed is augmented by the gravitative action of the weights which began to descend the instant valves 66 are opened by the descent of weight 15, the check valve 71 being closed and check valves 65 opening to accommodate the flow of water from the cylinder to the jacks. It will thus be seen that the first half of the extending movement of the lever which is of course employed for operating shaft 30 and causing the pump 33 to pump water into the reservoir is supplemented by the gravitative action of the weights 56 and that the last half of the extending movement of said lever which is the more powerful is utilized to elevate the weights in order to dispose them in such position that they will again coöperate with the fore part of the next extending movement of the lever. It will thus be seen that through the medium of this accumulating mechanism the leverage obtained in operating the pump is equalized and the latter operates at a uniform speed.

It will be apparent from the foregoing description taken in connection with the drawings that I have produced a water elevating and storage apparatus embodying the features of advantage enumerated as desirable and which obviously is susceptible of modification without departing from the principle of construction involved.

Having thus described the invention what I claim as new and desire to secure by Letters Patent is:—

1. In an apparatus of the character described, a pumping mechanism, an hydraulic jack connected thereto, a valve to prevent back flow from the jack to the pumping mechanism, a frame movable with the piston of the jack, a stationary frame, a lazy-tong lever between said frames and extended under movement by the movable frame toward the stationary frame, and a weight adapted to gravitate during the initial part of the movement of said frame.

2. In an apparatus of the character described, a pumping mechanism, an hydraulic jack connected thereto, a valve to prevent back flow from the jack to the pumping mechanism, a frame movable with the piston of the jack, a stationary frame, a lazy-tong lever between said frames and extended under movement by the movable frame toward the stationary frame, a weight adapted to gravitate during the initial part of the movement of said frame, and means whereby the weight during its gravitative movement coöperates with the jack in effecting the first part of the movement of the frame.

3. In an apparatus of the character described, a pumping mechanism, an hydraulic jack connected thereto, a valve to prevent back flow from the jack to the pumping mechanism, a frame movable with the piston of the jack, a stationary frame, a lazy-tong lever between said frames and extended under movement by the movable frame toward the stationary frame, a weight adapted to gravitate during the initial part of the movement of said frame, means whereby the weight during its gravitative movement coöperates with the jack in effecting the first part of the movement of the frame, and means whereby the weight is reëlevated during the latter part of such movement.

4. In an apparatus of the character described, a pumping mechanism, an hydraulic jack connected thereto, a valve to prevent back flow from the jack to the pumping mechanism, a frame movable with the piston of the jack, a stationary frame, a lazy-tong lever between said frames and extended under movement by the movable frame toward the stationary frame, a weight adapted to gravitate during the initial part of the movement of the frame, means whereby the weight during its gravitative movement coöperates with the jack in effecting the first part of the movement of the frame, and means whereby the frame in the latter part of its movement reëlevates the weight.

5. In an apparatus of the character described, a pumping mechanism, an hydraulic jack connected thereto, a valve to prevent back flow from the jack to the pumping mechanism, a frame movable with the piston of the jack, a stationary frame, a lazy-tong lever between said frames and extended under movement by the movable frame toward the stationary frame, a weight adapted to gravitate during the initial part of the movement of the frame, means whereby the weight during its gravitative movement coöperates with the jack in effecting the first part of the movement of the frame, means whereby the frame in the latter part of its movement reelevates the weight, and means to lock the weight elevated.

6. In an apparatus of the character described, a pumping mechanism, an hydraulic jack connected thereto, a valve to prevent back flow from the jack to the pumping mechanism, a frame movable with the piston of the jack, a stationary frame, a lazy-tong lever between said frames and extended under movement by the movable frame toward the stationary frame, a weight adapted to gravitate during the initial part of the movement of the frame, means whereby the weight during its gravitative movement coöperates with the jack in effecting the first part of the movement of the frame, means whereby the frame in the latter part of its movement reelevates the weight, means to lock the weight elevated, and means to free the water in the jack to permit the frame to reverse its movement.

7. In an apparatus of the character described, a pumping mechanism, an hydraulic jack connected thereto, a valve to prevent back flow from the jack to the pumping mechanism, a frame movable with the piston of the jack, a stationary frame, a lazy-tong lever between said frames and extended under movement by the movable frame toward the stationary frame, a weight adapted to gravitate during the initial part of the movement of the frame, means whereby the weight during its gravitative movement coöperates with the jack in effecting the first part of the movement of the frame, means whereby the frame in the latter part of its movement reelevates the weight, means to lock the weight elevated, means to free the water in the jack to permit the frame to reverse its movement, and means to release the weight as the next charging action of the jack begins.

8. In an apparatus of the character described, a stationary frame, a vertically movable frame below said stationary frame, a lazy-tong lever between said frames, means to raise the movable frame to effect the extension of the lazy-tong lever, a vertically movable weight, and means whereby said weight shall be raised with the latter part of the upward movement of the movable frame.

9. In an apparatus of the character described, a stationary frame, a vertically movable frame below said stationary frame, a lazy-tong lever between said frames, means to raise the movable frame to effect the extension of the lazy-tong lever, a vertically movable weight, means whereby said weight shall be raised with the latter part of the upward movement of the movable frame, and means for locking said weight elevated.

10. In an apparatus of the character described, a stationary frame, a vertically movable frame below said stationary frame, a lazy-tong lever between said frames, means to raise the movable frame to effect the extension of the lazy-tong lever, a vertically movable weight, means whereby said weight shall be raised with the latter part of the upward movement of the movable frame, means for locking said weight elevated, and means whereby the movable frame is permitted to resume its original position.

11. In an apparatus of the character described, a stationary frame, a vertically movable frame below said stationary frame, a lazy-tong lever between said frames, means to raise the movable frame to effect the extension of the lazy-tong lever, a vertically movable weight, means whereby said weight shall be raised with the latter part of the upward movement of the movable frame, means for locking said weight elevated, means whereby the movable frame is permitted to resume its original position, means whereby the weight is unlocked, and means whereby the weight in its gravitative movement coöperates in moving the frame in the first part of its upward movement.

12. In an apparatus of the character described, the combination of a stationary frame, a vertically movable frame below it, a lazy-tong lever between and adapted to be extended or retracted by upward or downward movement of the movable frame, one or more hydraulic jacks to raise the movable frame, a vertically movable weight to move downward by gravity, and means whereby said weight in such movement shall coöperate with said jack or jacks in raising said frame in the fore part of its movement.

13. In an apparatus of the character described, the combination of a stationary frame, a vertically movable frame below it, a lazy-tong lever between and adapted to be extended or retracted by upward or downward movement of the movable frame, one or more hydraulic jacks to raise the movable frame, a vertically movable weight to move downward by gravity, means whereby said weight in such movement shall coöperate with said jack or jacks in raising said frame in the fore part of its movement, and means whereby said frame in the latter part of such movement shall reëlevate said weight.

14. In an apparatus of the character described, the combination of a stationary frame, a vertically movable frame below it, a lazy-tong lever between and adapted to be extended or retracted by upward or downward movement of the movable frame, one or more hydraulic jacks to raise the movable frame, a vertically movable weight, a cylinder having its piston stem supporting said weight and charged with water when the weight is elevated, a pipe connection between said cylinder and said jack or jacks, a valve or valves controlling said connection, and means for opening said valve or valves as the jacks begin to receive the charge of water for raising said frame.

15. In an apparatus of the character described, the combination of a stationary frame, a vertically movable frame below it, a lazy-tong lever between and adapted to be extended or retracted by upward or downward movement of the movable frame, one or more hydraulic jacks to raise the movable frame, a vertically movable weight, a cylinder having its piston stem supporting said weight and charged with water when the weight is elevated, a pipe connection between said cylinder and said jack or jacks, a valve or valves controlling said connection, means for opening said valve or valves as the jacks begin to receive the charge of water for raising said frame, and means to close said valve or valves before the frame is fully elevated.

16. In an apparatus of the character described, the combination of a stationary frame, a vertically movable frame below it, a lazy-tong lever between and adapted to be extended or retracted by upward or downward movement of the movable frame, one or more hydraulic jacks to raise the movable frame, a vertically movable weight, a cylinder having its piston stem supporting said weight and charged with water when the weight is elevated, a pipe connection between said cylinder and said jack or jacks, a valve or valves controlling said connection, means for opening said valve or valves as the jacks begin to receive the charge of water for raising said frame, means to close said valve or valves before the frame is fully elevated, means whereby the latter part of the upward movement of the frame shall reëlevate the weight, and a check valve to prevent the escape of the water from the cylinder during the downward or reverse movement of said frame.

In testimony whereof I affix my signature, in the presence of two witnesses.

WILLIAM WOODROE DOUGLASS.

Witnesses:
C. E. MURPHY,
R. M. HANSON.